United States Patent
Yoon et al.

(10) Patent No.: US 11,965,951 B2
(45) Date of Patent: Apr. 23, 2024

(54) METHOD AND APPARATUS FOR OPERATING DEVICE FOR TRANSMITTING AND RECEIVING DATA THROUGH ULTRA-WIDEBAND (UWB)

(71) Applicant: SAMSUNG ELECTRONICS CO., LTD., Suwon-si (KR)

(72) Inventors: Kangjin Yoon, Suwon-si (KR); Mingyu Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 587 days.

(21) Appl. No.: 17/112,469

(22) Filed: Dec. 4, 2020

(65) Prior Publication Data
US 2021/0173064 A1    Jun. 10, 2021

Related U.S. Application Data

(60) Provisional application No. 62/944,531, filed on Dec. 6, 2019.

(51) Int. Cl.
| | |
|---|---|
| *G01S 11/02* | (2010.01) |
| *H04B 1/7163* | (2011.01) |
| *H04B 17/16* | (2015.01) |

(52) U.S. Cl.
CPC ............ *G01S 11/02* (2013.01); *H04B 1/7163* (2013.01); *H04B 2201/71634* (2013.01)

(58) Field of Classification Search
CPC .............................. G01S 11/02; H04B 1/7163
(Continued)

(56) References Cited

U.S. PATENT DOCUMENTS

| 8,879,407 B2 | 11/2014 | Ekbal et al. |
| 10,171,129 B1 | 1/2019 | Hammerschmidt et al. |

(Continued)

FOREIGN PATENT DOCUMENTS

| CN | 108024329 A | 5/2018 | |
| EP | 3651410 A1 * | 5/2020 | ........... G01S 13/765 |

(Continued)

OTHER PUBLICATIONS

International Search Report (PCT/ISA/210) and Written Opinion (PCT/ISA/237) issued by the International Searching Authority in International Application No. PCT/KR2020/012204, dated Dec. 10, 2020.

(Continued)

*Primary Examiner* — Harry K Liu
(74) *Attorney, Agent, or Firm* — Sughrue Mion, PLLC

(57) ABSTRACT

A method of operating a first target device for transmitting and receiving data through an ultra-wideband (UWB) channel in a wireless communication system includes receiving a ranging initiation message from an electronic device, transmitting, to the electronic device, a ranging response message in response to receiving the ranging initiation message, receiving, from the electronic device, a measurement report message comprising measured time information measured by the electronic device, based on a plurality of ranging response messages of a plurality of target devices, wherein the plurality of target devices includes the first target device and a second target device, determining time information of the first target device for determining a distance to the electronic device, based on the measurement report message, and determining the distance to the electronic device based on the time information.

19 Claims, 20 Drawing Sheets

(58) Field of Classification Search
USPC .......................................................... 342/458
See application file for complete search history.

(56) References Cited

U.S. PATENT DOCUMENTS

| | | | |
|---|---|---|---|
| 10,486,646 | B2 | 11/2019 | Ledvina et al. |
| 11,184,810 | B2 * | 11/2021 | Reddy ............... H04W 36/0022 |
| 2017/0171714 | A1 | 6/2017 | Cai |
| 2019/0135229 | A1 | 5/2019 | Ledvina et al. |

FOREIGN PATENT DOCUMENTS

| | | |
|---|---|---|
| JP | 2019-502115 A | 1/2019 |
| KR | 10-2011-0087602 A | 8/2011 |
| KR | 10-2019-0004240 A1 | 1/2019 |
| KR | 10-2019-0007206 A | 1/2019 |

OTHER PUBLICATIONS

J. Lee et al., "IEEE 802.15.4z MAC", IEEE P802.15-19-0034-00-004z, XP068148469, URL:https://mentor.ieee.org/802.15/dcn/19/15-19-0034-01-004z-ieee-802-15-4z-mac.docx, Dec. 2018, (50 total pages).

F. Despaux et al., "N-TWR: An accurate time-of-flight-based N-ary ranging protocol for Ultra-Wide band", Ad HoC Networks vol. 79, XP085452997, Jun. 7, 2018, (19 total pages).

Communication dated Sep. 21, 2022 by the European Patent Office in counterpart European Patent Application No. 20896191.2.

Office Action dated Jun. 27, 2023, issued by European Patent Office in European Patent Application No. 20896191.2.

Notice of Allowance dated Feb. 28, 2024, issued by European Patent Office in European Patent Application No. 20896191.2.

* cited by examiner

FIG. 7B

2 * N MEASUREMENT VALUES

| $T^1_{Round1}$ (FIRST ROUND-TRIP TIME) | $T^1_{Reply2}$ (FIRST REPLY TIME) | $T^2_{Round1}$ | $T^2_{Reply2}$ | ... | $T^N_{Round1}$ (SECOND ROUND-TRIP TIME) | $T^N_{Reply2}$ (SECOND REPLY TIME) |
|---|---|---|---|---|---|---|

FIG. 10B

N + 1 MEASUREMENT VALUES

| $T_{Round1}^{1}$ (FIRST ROUND-TRIP TIME) | $T_{Reply2}^{1}$ (FIRST REPLY TIME) | $T_{Reply2}^{2}$ | ... | $T_{Reply2}^{N}$ (SECOND REPLY TIME) |

FIG. 11A

| Parameter | Size (octets) | Notes |
|---|---|---|
| ⋮ | ⋮ | ⋮ |
| First round-trip time | 4 | Time difference between ranging initiation message and the first ranging response message |
| Reply time list | Variable | List of responder addresses and reply time measurements for responders |

FIG. 11B

| Parameter | Size (octets) | Notes |
|---|---|---|
| Address | 2 or 8 | Address of responder |
| Reply time | 4 | Time difference between ranging final message and ranging response message from responder |

FIG. 12B

N + 1 MEASUREMENT VALUES

| $T^1_{Round1}$ (FIRST ROUND-TRIP TIME) | $T^1_{Reply2}$ (FIRST REPLY TIME) | $T^2_{Round1}$ | ... | $T^N_{Round1}$ (SECOND ROUND-TRIP TIME) |
|---|---|---|---|---|

FIG. 13A

| Parameter | Size (octets) | Notes |
|---|---|---|
| ⋮ | ⋮ | ⋮ |
| First reply time | 4 | Time difference between ranging final message and the first ranging response message |
| Round-trip time list | Variable | List of responder addresses and round-trip time measurements for responders |

FIG. 13B

| Parameter | Size (octets) | Notes |
|---|---|---|
| Address | 2 or 8 | Address of responder |
| Round-trip time | 4 | Time difference between ranging initiation message and ranging response message from responder |

METHOD AND APPARATUS FOR OPERATING DEVICE FOR TRANSMITTING AND RECEIVING DATA THROUGH ULTRA-WIDEBAND (UWB)

CROSS-REFERENCE TO RELATED APPLICATION(S)

This application is based on and claims the benefit of U.S. Provisional Patent Application No. 62/944,531, filed on Dec. 6, 2019, in the United States Patent and Trademark Office.

BACKGROUND

1. Field

The disclosure relates to an electronic device for transmitting and receiving a measurement value for determining a time-of-flight (ToF) value and method of operating the electronic device.

2. Description of Related Art

The Internet is evolving from a human-centered connection network through which humans create and consume information to an Internet of Things (IoT) network through which distributed elements and objects exchange and process information. Internet of Everything (IoE) technology, which is a combination of IoT technology and big data processing technology through connection with a cloud server, is also emerging. In order to implement the IoT, technology elements, such as sensing technology, wired/wireless communication and network infrastructure, service interface technology, and security technology are required. Technology for inter-object connection, such as a sensor network, machine to machine (M2M) communication, or machine-type communication (MTC), has recently been studied.

In an IoT environment, intelligent Internet technology (IT) services collect and analyze data generated by connected objects, and thereby new value in human life may be provided. The IoT environment may be applied to numerous fields, such as smart homes, smart buildings, smart cities, smart cars or connected cars, smart grids, health care, smart home appliances, and advanced medical services through convergence and integration of existing information technology (IT) and various industries.

As various services may be provided with the development of wireless communication systems, there is a demand for a method of effectively providing such services. For example, ranging technology for measuring a distance between electronic devices by using an ultra-wideband (UWB) may be used for medium access control (MAC). The UWB refers to radio communication technology that uses a very wide frequency band of several GHz or more in a base band without using a radio carrier.

Accordingly, a method of efficiently transmitting a message for determining a distance between electronic devices by using ranging technology would be desirable.

SUMMARY

Provided is a method of efficiently transmitting a message for determining a distance between electronic devices when ranging is performed.

Additional aspects will be set forth in part in the description which follows and, in part, will be apparent from the description, or may be learned by practice of the embodiments of the disclosure.

According to an embodiment of the disclosure, an operating method of a first target device for transmitting and receiving data through an ultra-wideband (UWB) in a wireless communication system includes receiving a ranging initiation message from an electronic device, transmitting, to the electronic device, a ranging response message in response to receiving the ranging initiation message, receiving, from the electronic device, a measurement report message comprising measured time information measured by the electronic device, based on a plurality of ranging response messages of a plurality of target devices, wherein the plurality of target devices includes the first target device and a second target device, determining time information of the first target device for determining a distance to the electronic device, based on the measurement report message, and determining the distance to the electronic device based on the time information.

The measurement report message may include a first round-trip time that is a time difference between a time when the electronic device transmits the ranging initiation message and a time when the electronic device receives a ranging response message from the second target device that transmits a first ranging response message among the plurality of ranging response messages, and a reply time list comprising time differences between times when the electronic device receives the plurality of ranging response messages from the plurality of target devices and a time when the electronic device transmits a ranging final message.

The reply time list may include a first reply time that is a time difference between the time when the electronic device receives the ranging response message from the second target device and the time when the electronic device transmits the ranging final message, and a second reply time that is a time difference between a time when the electronic device receives the ranging response message from the first target device and the time when the electronic device transmits the ranging final message.

The determining of the time information of the first target device based on the measurement report message may include determining a second round-trip time that is a time difference between the time when the electronic device transmits the ranging initiation message and the time when the electronic device receives the ranging response message from the first target device, based on the first round-trip time, the first reply time, and the second reply time included in the measurement report message.

The determining of the time information of the first target device based on the measurement report message may include determining a second round-trip time that is round trip time about the first target device measured by the electronic device by subtracting the second reply time from a sum of the first round-trip time and the first reply time for the second target device.

The measurement report message may further include an address of each target device among the plurality of target devices.

The measurement report message may include a first reply time that is a time difference between a time when the electronic device receives a first ranging response message among the plurality of ranging response messages from the second target device among the plurality of target devices and a time when the electronic device transmits a ranging final message, and a round-trip time list comprising time differences between times when the electronic device transmits the plurality of ranging initiation messages and times when the electronic device receives the plurality of ranging response messages from the plurality of target devices.

The round-trip time list may include a first round-trip time that is a time difference between a time when the electronic device transmits the ranging initiation message and a time when the electronic device receives the first ranging response message from the second target device, and a second round-trip time that is a third time difference between a time when the electronic device transmits the ranging initiation message and a time when the electronic device receives a ranging response message from the first target device.

The determining of the time information of the first target device based on the measurement report message may include determining a second reply time that is a time difference between the time when the electronic device receives the ranging response message from the first target device and the time when the electronic device transmits the ranging final message, based on the first reply time, the first round-trip time, and the second round-trip time.

The measurement report message may be broadcast from the electronic device.

According to another embodiment of the disclosure, an operating method of an electronic device for transmitting and receiving data through an ultra-wideband (UWB) in a wireless communication system includes transmitting a plurality of ranging initiation messages to a plurality of target devices comprising a first target device and a second target device, receiving, from the plurality of target devices, a plurality of ranging response messages in response to the ranging initiation message, transmitting a ranging final message to the plurality of target devices, generating a measurement report message comprising measured time information measured for the plurality of target devices, based on the plurality of ranging response messages, and transmitting the measurement report message to the plurality of target devices.

According to another embodiment of the disclosure, a first target device includes a transceiver, and a processor connected to the transceiver and configured to execute program instructions stored in a memory to control the transceiver to receive a ranging initiation message from an electronic device, control the transceiver to transmit, to the electronic device, a ranging response message in response to receiving the ranging initiation message, control the transceiver to receive, from the electronic device, a measurement report message comprising measured time information measured by the electronic device, based on a plurality of ranging response messages of a plurality of target devices, wherein the plurality of target devices includes the first target device and a second target device, determine time information of the first target device for determining a distance to the electronic device, based on the measurement report message, and determine the distance to the electronic device based on the time information.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7B is a diagram illustrating a measurement report message;

FIG. 10B is a diagram illustrating a structure of a measurement report message according to an embodiment of the disclosure;

FIG. 11A is a diagram for describing parameters included in a measurement report message, according to an embodiment of the disclosure;

FIG. 11B is a diagram for describing parameters included in a reply time list, according to an embodiment of the disclosure;

FIG. 12B is a diagram illustrating a structure of a measurement report message according to an embodiment of the disclosure;

FIG. 13A is a diagram for describing parameters included in a measurement report message, according to an embodiment of the disclosure;

FIG. 13B is a diagram for describing parameters included in a round-trip time list, according to an embodiment of the disclosure;

DETAILED DESCRIPTION

Figure 1:
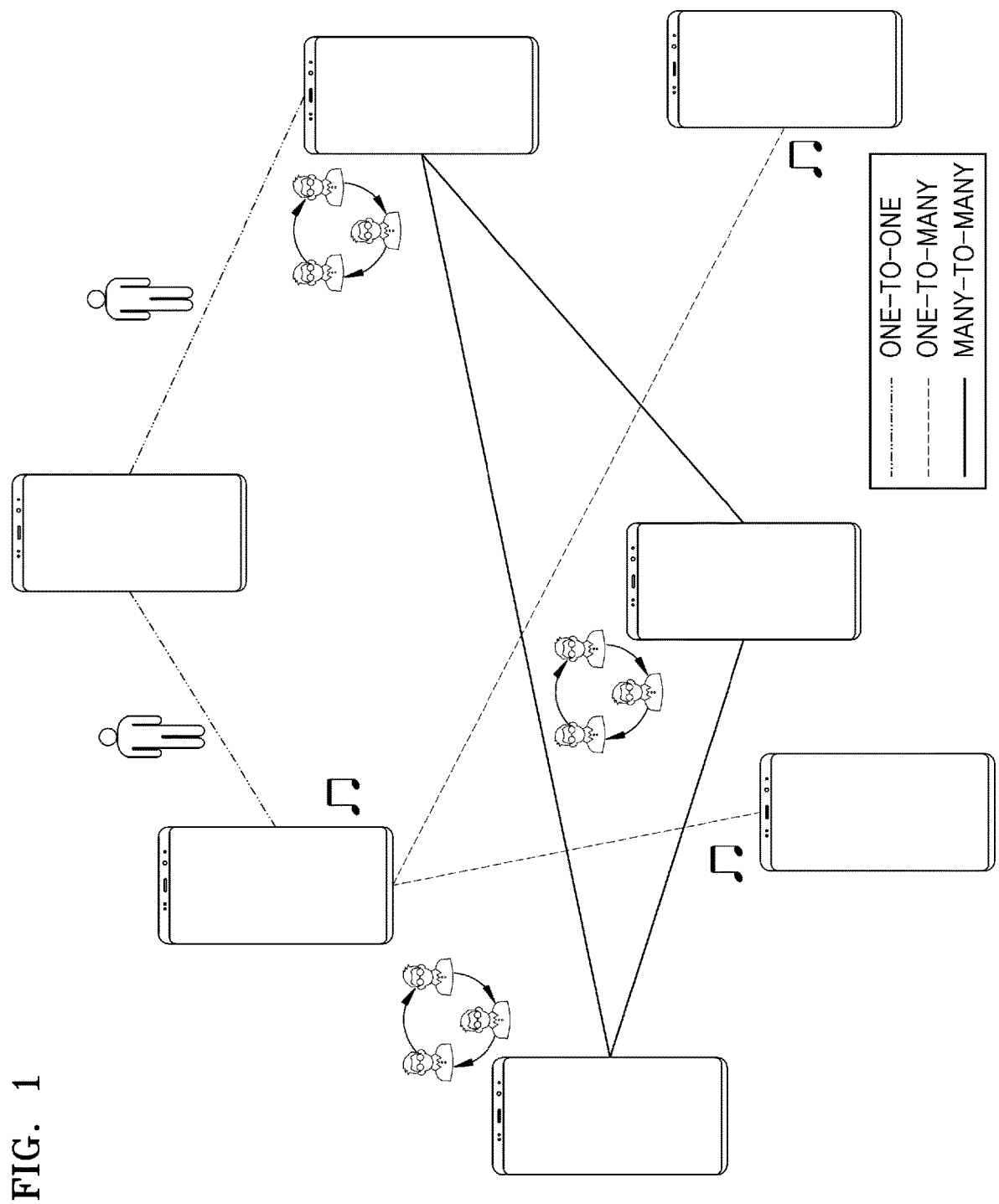
FIG. 1 is a diagram for describing a general device-to-device (D2D) communication procedure.

Hereinafter, embodiments of the disclosure will be described in detail with reference to the accompanying drawings so that the embodiments of the disclosure may be fully conveyed to those of ordinary skill in the art. However, the disclosure may be embodied in many different forms and is not limited to the embodiments of the disclosure. For clarity, parts unrelated to a necessary understanding of the disclosure are omitted in the drawings. Like components are denoted by like reference numerals throughout the disclosure.

In the disclosure, general terms that widely understood are selected, in consideration of functions of the disclosure, but various other terms may be selected according to the intentions of technicians in the art, precedents, new technologies, etc. Accordingly, the terms used herein should be defined not based on the names thereof but based on the meanings thereof and the whole context of the disclosure.

Terms such as first and second may be labels used to describe various components but the components should not be limited by the terms. These terms are only used to distinguish one component from another.

Also, the terms used herein are for the purpose of describing certain embodiments of the disclosure only and are not intended to be limiting of the disclosure. As used herein, the singular expressions are intended to include plural forms as well, unless the context clearly dictates otherwise. Also, throughout the disclosure, when an element is referred to as being "connected" to another element, the element may be "directly connected" to the other element, may be connected to the other element through one or more intervening elements, or may be "electrically connected" to the other element with or without another element therebetween. Also, it will be understood that when an element is referred to as "including" another element, the element may further include other elements unless mentioned otherwise.

As used herein, "the" and similar referents may be used to indicate both singular and plural forms. Also, when there is no description explicitly specifying an order of operations of a method according to the disclosure, the operations may be performed in an appropriate order. The disclosure is not limited to the order of the operations described.

The expression "in an embodiment" and the like appearing in various parts of the disclosure are not intended to refer to the same embodiment.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

In the disclosure, a layer (or a layer apparatus) may also be referred to as an entity.

An embodiment of the disclosure may be represented by functional block configurations and various operations. Some or all of the functional blocks may be implemented by various configurations of hardware and/or software for performing certain functions. For example, the functional blocks of the disclosure may be implemented by one or more microprocessors or by circuit configurations to implement a certain function. Also, for example, the functional blocks of the disclosure may be implemented in various programming or scripting languages. The functional blocks may be implemented via one or more algorithms described in computer-readable instructions that are executed by one or more processors.

Also, lines or members connecting elements illustrated in the drawings are merely illustrative of functional connections and/or physical or circuit connections. In an actual device, the connections between components may be represented by various functional connections, physical connections, or circuit connections that are replaceable or added.

In general, wireless sensor network technology is largely classified into wireless local area network (WLAN) and wireless personal area network (WPAN) according to a distance identified. In this case, WLAN is IEEE 802.11-based technology for connection to a backbone network within a radius of 100 m. WPAN is IEEE 802.15-based technology, and examples of WPAN include Bluetooth, ZigBee, ultra-wideband (UWB), and the like. A wireless network in which such wireless network technology is implemented may be composed of a plurality of electronic devices. In this case, the plurality of electronic devices perform communication in an active period by using a single channel. That is, the plurality of communication electronic devices may collect and transmit data packets in the active period.

The term UWB may refer to short-range high-speed radio communication technology using a wide frequency band of several GHz or more, a low spectral density, and a short pulse width (1 to 4 nsec) in a baseband state. Also, UWB may be understood as a band to which UWB communication is applied. A ranging method performed between electronic devices will now be described based on a UWB communication method, but the UWB communication method is merely an example and various radio communication technologies may be used in practice.

Devices (both electronic devices and target devices) according to embodiments of the disclosure may include a fixed terminal embodied as a computer device or a mobile terminal. The devices may communicate with other devices and/or servers by using a wireless and/or wired communication method. For example, the electronic devices and the target devices may include, but are not limited to, a smartphone, a mobile terminal, a laptop computer, a digital broadcasting terminal, a personal digital assistant (PDA), a portable multimedia player (PMP), a navigation device, a slate PC, a tablet PC, a digital TV, a desktop computer, a refrigerator, a projector, a car, a smart car, a printer, and the like.

Hereinafter, the disclosure will be described in detail with reference to the accompanying drawings.

FIG. 1 is a diagram for describing a general device-to-device (D2D) communication procedure.

The term D2D communication refers to a way in which electronic devices, which are geographically close to each other, communicate directly with each other without intermediary infrastructure such as a base station or access point. As shown in FIG. 1, electronic devices may communicate in a one-to-one manner, a one-to-many manner, or a many-to-many manner. In D2D communication, unlicensed frequency bands such as Wi-Fi Direct and Bluetooth may be used. Alternatively, in D2D communication, licensed frequency bands may be used to improve frequency utilization efficiency of cellular systems. Although D2D communication is restrictively used to refer to M2M communication or machine intelligent communication, in the disclosure, D2D communication is intended to refer to communication between electronic devices having a communication function and also communication between various types of electronic devices having a communication function, such as smartphones or personal computers.

Figure 2:
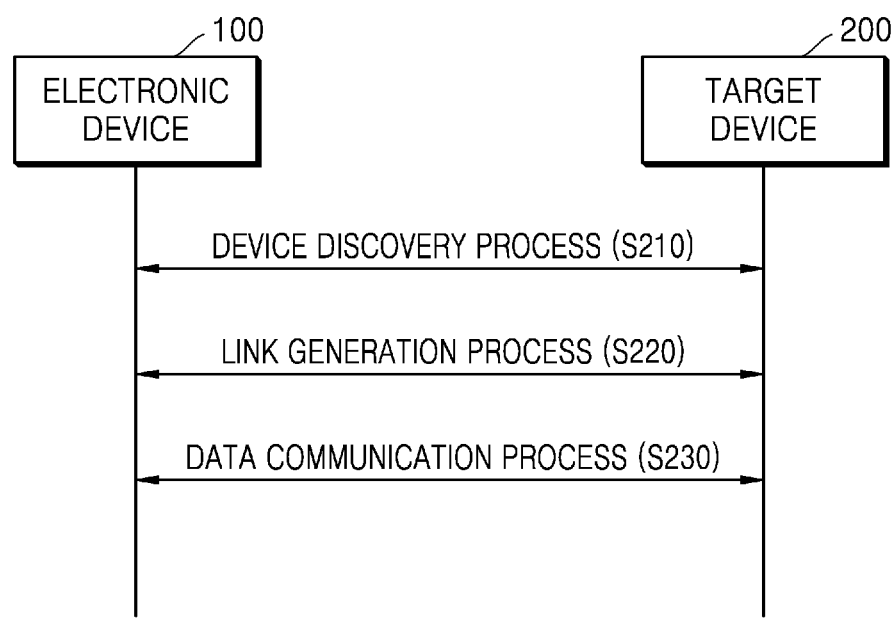
FIG. 2 is a diagram illustrating a communication process among a plurality of electronic devices.

FIG. 2 is a diagram illustrating a communication process among a plurality of electronic devices.

An electronic device 100 and a target device 200 may perform communication through a device discovery process S210, a link generation process S220, and a data communication process S230.

In the device discovery process S210, each of the electronic device 100 and the target device 200 may search for other electronic devices capable of performing D2D communication among electronic devices that are within communication range. Thus, each of the electronic device 100 and the target device 200 may determine whether to create a link for D2D communication based on discovering devices within the communication range that support D2D communication. For example, the electronic device 100 may generally broadcast a discovery signal or transmit a discovery signal to the target device 200 so that the target device 200 may be discovered by the electronic device 100. In addition, the electronic device 100 may receive a discovery signal transmitted from the target device 200 to identify that that other electronic devices capable of performing D2D communication are within a D2D communication range.

In the link generation process S220, each of the electronic device 100 and the target device 200 may create a link for data transmission with an electronic device, which is to transmit data, among the electronic devices discovered in the device discovery process S210. For example, the electronic device 100 may create a link for data transmission with the target device 200 discovered in the device discovery process S210.

In the data communication process S230, each of the electronic device 100 and the target device 200 may transmit data to and receive data from the devices for which the link for data transmission is created in the link generation process S220. For example, the electronic device 100 may transmit data to and receive data from the target device 200 through the link created in the link generation process S220.

Various embodiments of the disclosure relate to medium access control (MAC) based on D2D communication described above, and measurement of a distance between electronic devices for MAC may be necessary. In this case, UWB ranging technology may be used to measure a distance between electronic devices. For example, when a digital key stored in a smartphone is used to open or close the door of a vehicle, the vehicle may measure a distance between the smartphone and the vehicle by using a number of UWB communication modules (e.g., six UWB communication modules) and estimate a location of the smartphone based on a result of the measurement. The vehicle and the smartphone are capable of using multicast ranging or broadcast ranging.

An electronic device and a target device according to an embodiment of the disclosure may perform ranging by using a ranging control frame. Two types of devices related to ranging control may be referred to as (i) a "controller" or "controlling device" and (ii) a "controlee" or a "controlled device." Other related nomenclatures for the two types of devices may include master/slave and client/server.

First, the controller may be defined as a device that defines and controls ranging parameters by transmitting a ranging control frame together with a ranging control information element (IE). The ranging control frame is used to configure the ranging parameters in the controlee.

The controlee may be defined as a device that uses the ranging parameters received from the controller. At least one controlee may be managed by the controller. A method of determining a role of a device (e.g., a role of a controller or a role of a controlee) and selecting ranging parameters may be implemented in various ways.

Two types of devices for ranging control may be referred to as an "initiator" and a "responder". The initiator refers to a device that starts ranging by sending a poll. The responder refers to a device that responds to the poll received from the initiator.

The controller according to an embodiment of the disclosure is capable of determining devices to participate in ranging and device types by using a ranging initiator/responder list (IRL) IE or a ranging scheduling (RS) IE. The IRL IE and the RS IE may be transmitted in a ranging control frame. In the case of scheduling-based ranging, the RS IE may be configured by the controller to manage resources and indicate roles of devices (i.e., a role of an initiator or a responder). The IRL IE may be used to determine roles of devices when the RS IE is not used in the case of contention-based ranging.

A schedule mode field of a ranging control IE indicates whether a ranging frame is transmitted using contention or a schedule. Devices that are not specified by such IEs may not participate in ranging. When transmission of a poll frame by a device is required, a device type of the device may be determined as an initiator, whereas a device responding to the poll frame may be determined as a responder.

In the case of contention-based multicast/broadcast ranging, the controller may be the only initiator in ranging and prevent the IRL IE from being added to the ranging control frame when a responder is designated in a destination address field included in a MAC header of the ranging control frame.

Because the ranging control frame includes the IRL IE or the RS IE, the controlee may identify whether a poll is to be transmitted by receiving the ranging control frame. When a device type of the controlee is designated as an initiator in the IRL IE or the RS IE, the controlee may transmit a poll frame. Both the controller and control may serve as initiators or responders.

The electronic device 100 according to an embodiment of the disclosure may refer to an initiator, and the target device 200 may refer to a responder.

Figure 3:
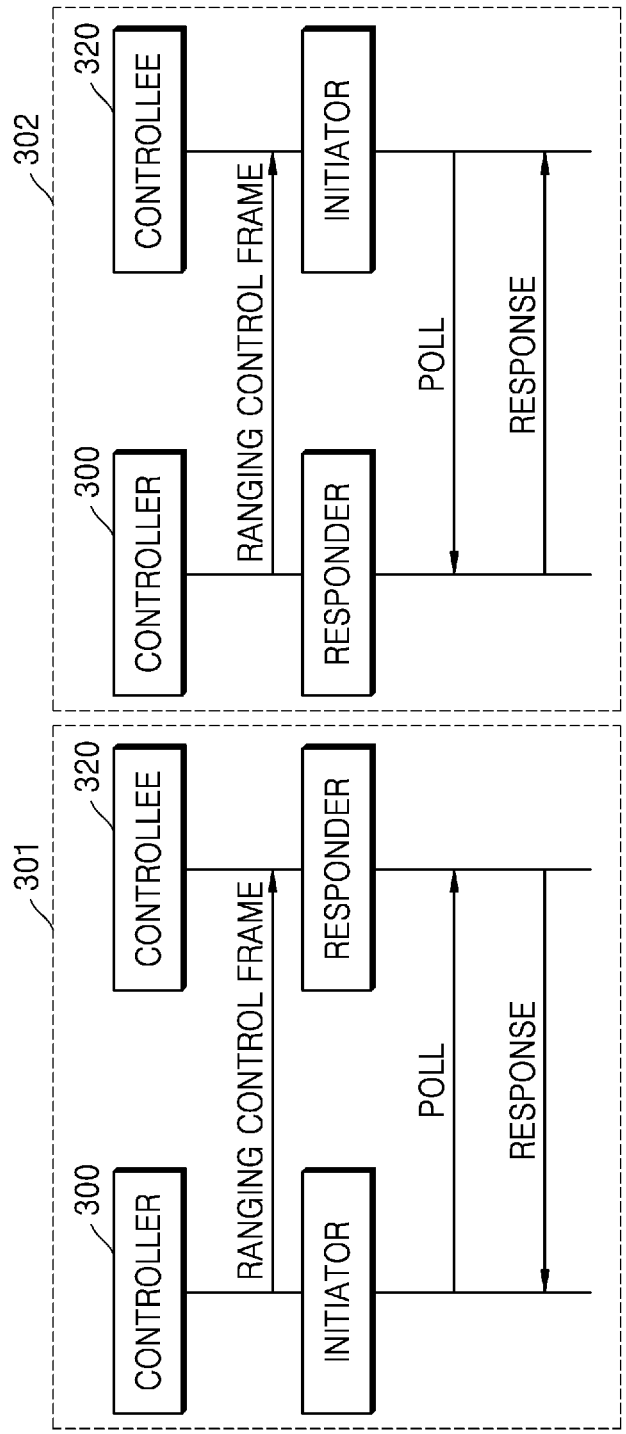
FIG. 3 illustrates single-sided two-way ranging (SS-TWR) using a ranging control frame, according to an embodiment of the disclosure.

FIG. 3 illustrates single-sided two-way ranging (SS-TWR) using a ranging control frame according to an embodiment of the disclosure. SS-TWR is one of various ranging methods introduced in the disclosure.

When a controller 300 is set to transmit a poll frame as shown in a flowchart 301 of FIG. 3, the controller 300 may serve as an initiator and may transmit the poll frame. On the other hand, when a controlee 320 is set to transmit a poll frame as shown in a flowchart 302 of FIG. 3, the controlee 320 may serve as an initiator and may transmit the poll frame.

A ranging control frame may include a ranging acknowledgment IE indicating a ranging response type. A plurality of controlees may be used for multicast/broadcast/M2M ranging.

Ranging blocks each represent a virtual time frame for ranging. The ranging blocks each include several ranging rounds. Each of the ranging rounds indicates completion of all ranging events between ranging devices of a UWB network. Each of the ranging rounds includes several ranging slots. The ranging slots represent virtual time units for transmission of a ranging frame. The ranging blocks, the ranging rounds, and the ranging slots are based on virtual times and thus do not require time-based synchronization.

Figure 4:
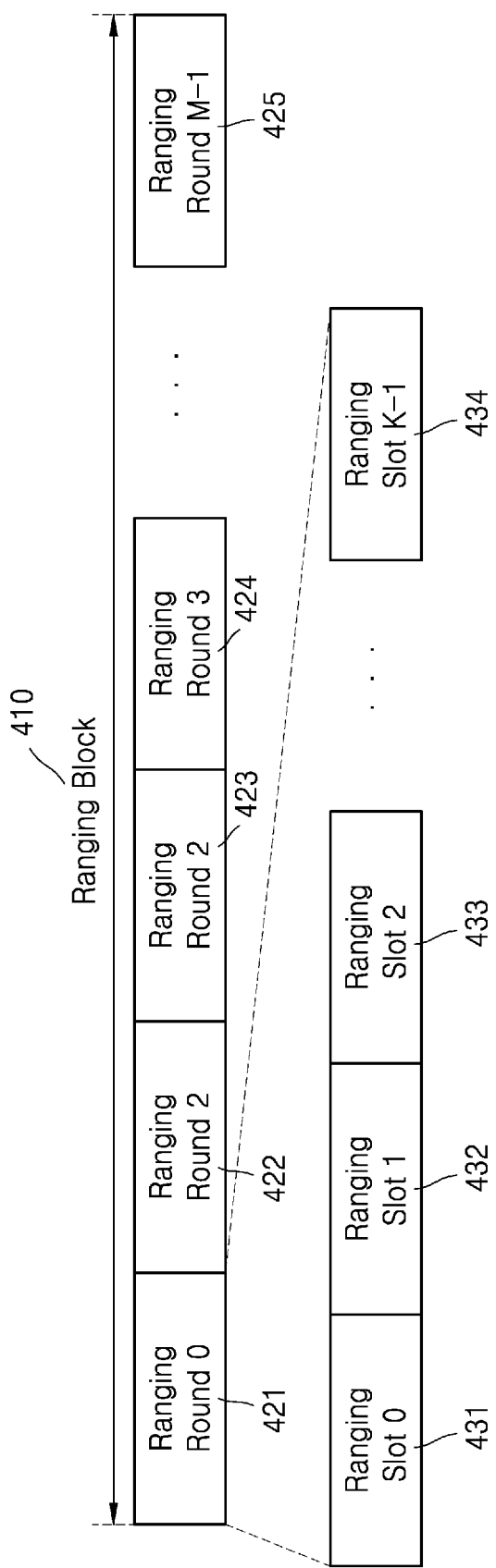
FIG. 4 illustrates a ranging block structure.

FIG. 4 illustrates a ranging block structure.

As shown in FIG. 4, a ranging block 410 may include N ranging rounds 421, 422, 423, 424, . . . , and 425. The ranging round 421 may include M ranging slots 431, 432, 433, . . . , and 434.

A time unit (TU) is defined as a minimum MAC time step in PHY units. A ranging slot length may be defined as an integer number of TUs. A ranging slot length may be adjusted by a multiplier of a TU. A TU is fixed to 250 µs that is an integer multiple of a reciprocal of a chipping rate of 499.2 MHz. A ranging round is defined as an integer number of ranging slots. A ranging round length may be adjusted by a multiplier of a ranging slot. A ranging block length is defined as an integer multiple of MinimumBlockLength. A ranging block length may be adjusted by a multiplier of Minimumblocklength. MinimumBlockLength is defined as an integer number of TUs.

Figure 5:
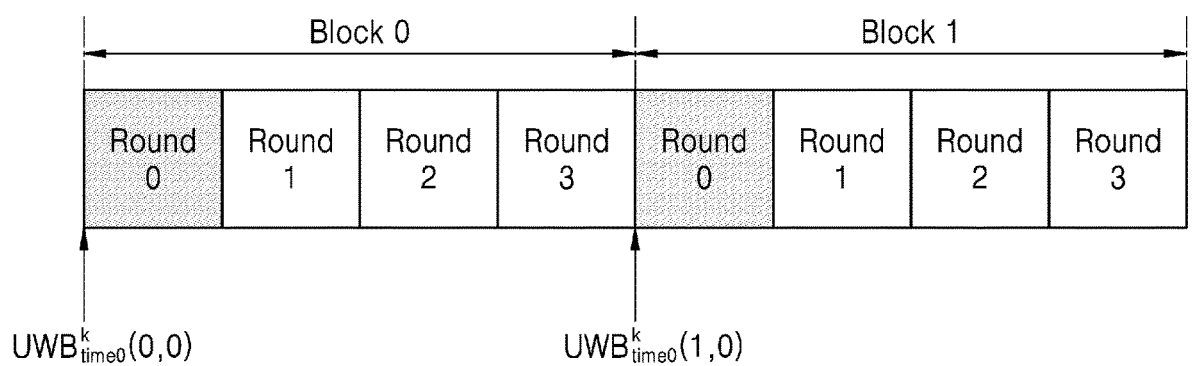
FIG. 5 is a diagram for describing a block-based mode.

FIG. 5 is a diagram for describing a block-based mode.

In a block-based mode, a ranging block structure using a timeline, which is set at certain intervals of time, is used.

In the block-based mode, a ranging block structure may be determined based on a ranging block length field, a ranging round duration field, and a ranging slot length field which are included in information about ranging control.

Equation 1 is an equation for calculating a time duration from a ranging round with an index '0' of a ranging block with an index '0' to a ranging round with an index '0' of a ranging block with an index '1' in a $k^{th}$ session.

$$UWB_{time0}^{k}(i,0) = UWB_{time0}^{k}(0,0) + i \times T_{Block}^{k} \quad i=1,2,\ldots \quad \text{[Equation 1]}$$

Equation 2 is an equation for deriving the number of ranging rounds included in a ranging block.

$$\text{Number of Ranging Rounds} = \frac{\text{Ranging Block Duration}}{\text{Ranging Round Duration}} \quad \text{[Equation 2]}$$

Equation 3 is an equation for deriving the number of ranging slots included in a ranging round.

$$\text{Number of Ranging Slots} = \frac{\text{Ranging Round Duration}}{\text{Ranging Slot Duration}} \quad \text{[Equation 3]}$$

When a device receives a ranging control message (RCM), the device may set a structure of a ranging block and a related timeline for ranging by using field values included in a ranging control information element. In another embodiment of the disclosure, the ranging block structure may be set by a next higher layer.

A controller may repeatedly transmit the ranging block structure in all ranging control messages. When the ranging block structure needs to be changed or updated, the controller may transmit a ranging block update IE (RBU IE) including fields related to updating of a ranging block.

Configurations of ranging blocks will be described with reference to FIGS. 4 and 5 below. Indexes of the ranging blocks may be set to increase sequentially, based on a first ranging block. For example, a block index of the first ranging block may be 0, and block indexes of the ranging blocks may be set to incrementally and sequentially increase by one.

Furthermore, indexes of ranging rounds in each of the ranging blocks may be set to increase sequentially, based on a first ranging round in the ranging block. For example, when M ranging rounds are included in a ranging block, a ranging round index of a first ranging round of the ranging block may be 0 and a ranging round index of a last ranging round of the ranging block may be M−1.

Referring to FIGS. 4 and 5, indexes of ranging slots in each ranging round may be set to increase sequentially, based on a first ranging slot in each ranging round. For example, a ranging round index of the first ranging round may be 0. For example, when K ranging slots are included in a ranging round, a ranging slot index of a first ranging slot of the ranging round may be 0 and a ranging slot index of a last ranging slot of the ranging round may be K−1.

In this case, for example, the controller may transmit a first ranging control message in the first ranging slot (ranging slot index '0') of the first ranging round (ranging round index '0') included in the first ranging block (ranging block index '0').

To exchange a range message in the first ranging round, the controller may transmit a ranging control message packet in the first ranging slot.

Figure 6:
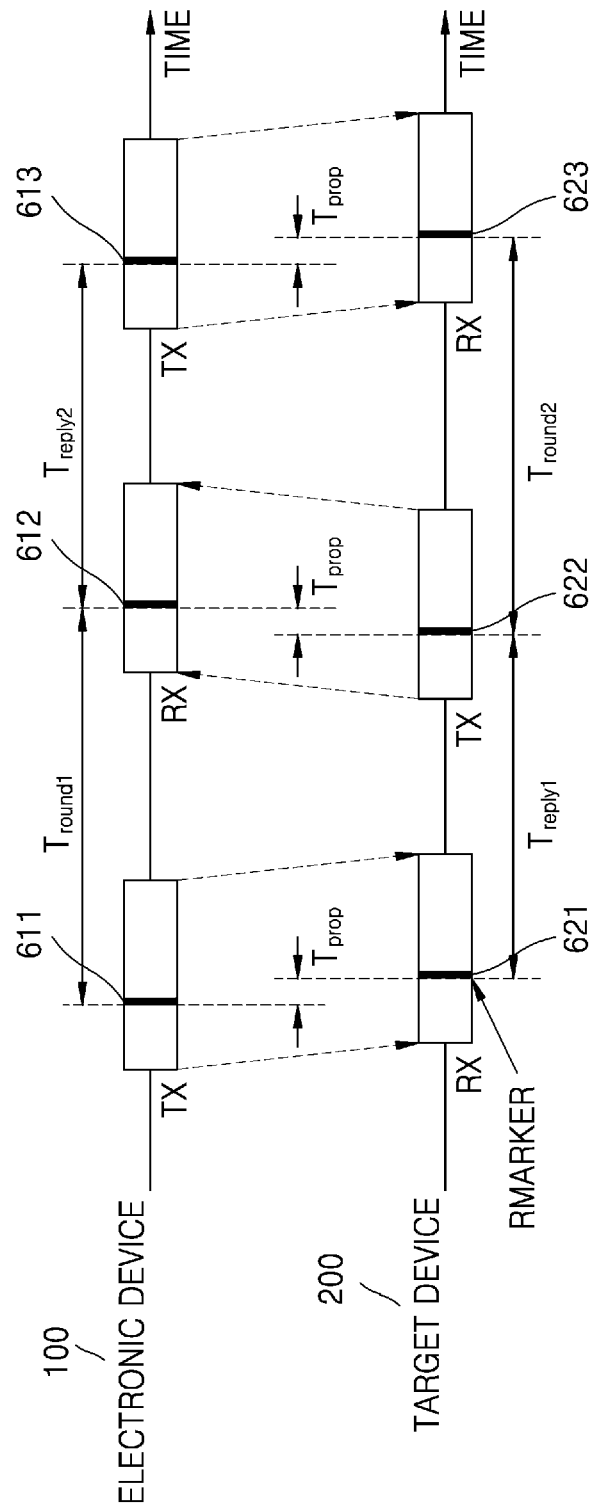
FIG. 6 is a diagram for describing a double-sided two-way ranging (DS-TWR) operation of electronic devices.

FIG. 6 is a diagram for describing a double-sided two-way ranging (DS-TWR) operation of electronic devices.

The RMARKER illustrated in FIG. 6 may refer to data in a frame for determining a reference time. An electronic device may measure a time interval by using the RMARKER.

The electronic device 100 may measure a time between 1-1$^{th}$ RMARKER 611 included in a frame transmitted (TX) to the target device 200 and 1-2$^{th}$ RMARKER 612 included in a frame received (RX) from the target device 200 as $T_{round1}$.

According to an embodiment of the disclosure, $T_{round1}$ may denote a round-trip time. For example, the frame including the 1-1$^{th}$ RMARKER 611 may refer to a frame included in a ranging initiation message. Also, the frame including the 1-2$^{th}$ RMARKER 612 may refer to a frame included in a ranging response message.

The target device 200 may measure a time between 2-1th RMARKER 621 included in a frame received (RX) from the electronic device 100 and 2-2th RMARKER 622 included in a frame transmitted (TX) to the electronic device 100 as $T_{reply1}$.

The electronic device 100 may measure a time between the 1-2$^{th}$ RMARKER 612 included in the frame received (RX) from the target device 200 and 1-3$^{th}$ RMARKER 613 included in a frame transmitted (TX) to the target device 200 as $T_{reply2}$.

According to an embodiment of the disclosure, $T_{reply2}$ may denote a reply time. For example, the frame including the 1-3$^{th}$ RMARKER 613 may refer to a frame included in a ranging final message.

The target device 200 may measure a time between the 2-2$^{th}$ RMARKER 622 included in the frame transmitted (TX) to the electronic device 100 and 2-3$^{th}$ RMARKER 623 included in a frame received (RX) from the target device 200 as $T_{round2}$.

A time-of-flight (ToF) time ToF may be calculated by using Equation 4.

$$ToF = \frac{T_{round1} \times T_{round2} - T_{reply1} \times T_{reply2}}{T_{round1} + T_{round2} + T_{reply1} + T_{reply2}} \quad \text{[Equation 4]}$$

Figure 7A:
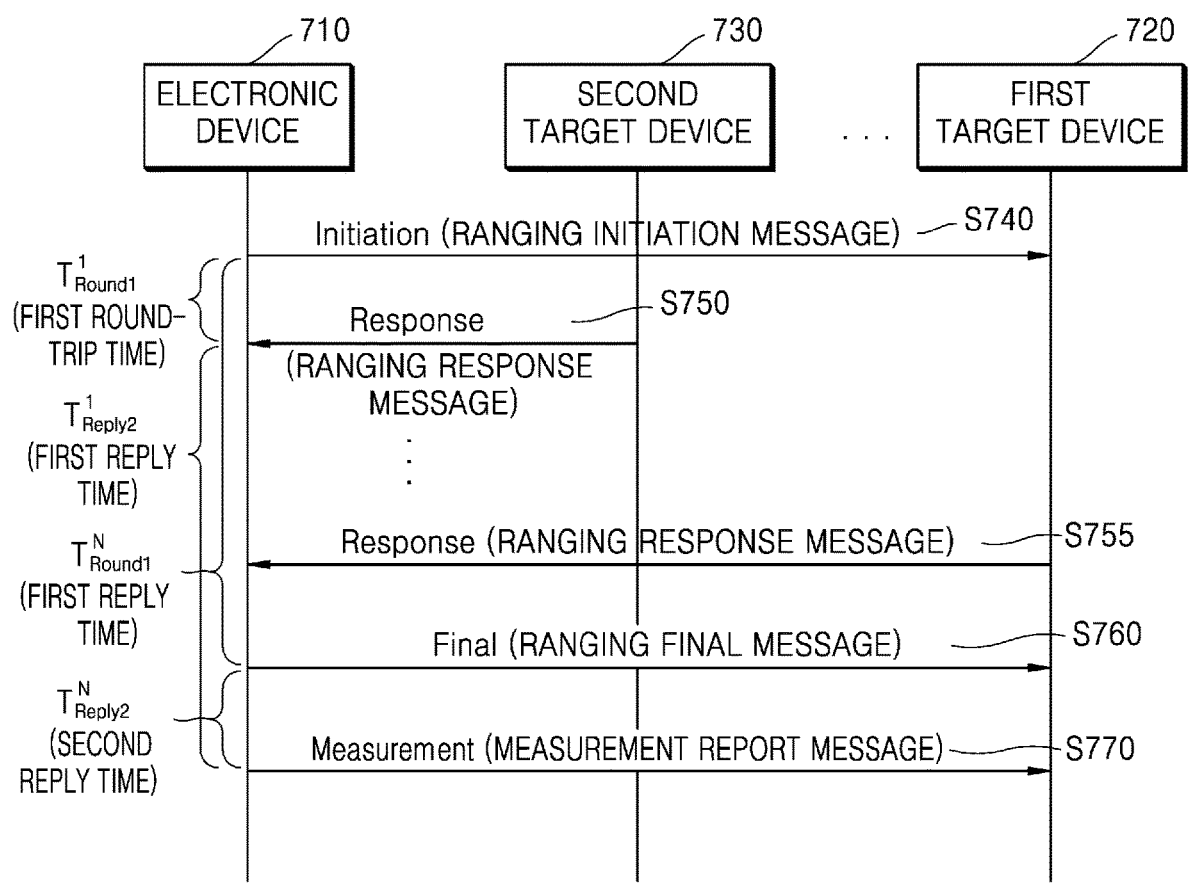
FIG. 7A is a diagram for describing a DS-TWR operation of electronic devices.

FIG. 7A is a diagram for describing a double-sided two-way ranging (DS-TWR) operation of electronic devices.

In FIG. 7A, the electronic device 710 may perform UWB ranging by using a DS-TWR ranging method with one or more devices.

The electronic device 710 in the disclosure may be an initiator that initiates ranging. Also, a target device that is a device performing ranging with the electronic device 710 may refer to a responder. A plurality of target devices may exist. For example, N responders may exist. In FIG. 7A, a first responder may correspond to a second target device 730, and an N$^{th}$ responder may correspond to a first target device 720. The N$^{th}$ responder may refer to a responder other than the first responder that transmits a first ranging response message to the electronic device 710.

In operation S740, the electronic device 710 may transmit a ranging initiation message to one or more target devices. The electronic device 710 may broadcast the ranging initiation message to the target devices.

In operations S750 through S755, each target device may transmit a ranging response message in response to the ranging initiation message to the electronic device 710. Each target device may transmit the ranging response message in a slot allocated to each target device. Because each target device transmits the ranging response message in its allocated slot, N response messages may be transmitted to the electronic device 710. For example, in operation S750, the second target device 730 may transmit a ranging response message to the electronic device 710, and in operation S755, the first target device 720 may also transmit a ranging response message to the electronic device 710.

In operation S760, the electronic device 710 may transmit a ranging final message to the one or more devices. For example, after receiving N response messages, the electronic device 710 may transmit a ranging final message to the target devices. For example, the ranging initiation message, the ranging response message, and the ranging final message may each be a ranging frame and may include scrambled timestamp sequence (STS) code.

In operation S770, the electronic device 710 may transmit a measurement report message to the one or more target devices. The electronic device 710 may broadcast a measurement report message to the target devices.

An estimated distance (ranging) between two electronic devices may be calculated by multiplying a ToF value calculated by using Equation 4 by a speed of light (3*10^8 m/s).

A first round-trip time ($T^1_{Round1}$) in the disclosure may refer to round-trip time information of the first responder. For example, the first round-trip time ($T^1_{Round1}$) may refer to a time difference between a time when the electronic device 710 transmits the ranging initiation message to the second target device 730 and a time when the electronic device 710 receives the ranging response message from the second target device 730.

A first reply time ($T^1_{Reply2}$) in the disclosure may refer to reply time information of the first responder. For example, the first reply time ($T^1_{Reply2}$) may refer to a time difference between a time when the electronic device 710 receives the ranging response message from the second target device 730 and a time when the electronic device 710 transmits the ranging final message to the second target device 730.

A second round-trip time ($T^N_{Round1}$) in the disclosure may refer to round-trip time information of the $N^{th}$ responder. For example, the second round-trip time ($T^N_{Round1}$) may refer to a time difference between a time when the electronic device 710 transmits the ranging initiation message to the first target device 720 and a time when the electronic device 710 receives the ranging response message from the first target device 720.

A second reply time ($T^N_{Reply2}$) in the disclosure may refer to reply time information of the $N^{th}$ responder. For example, the second reply time ($T^N_{Reply2}$) may refer to a time difference between a time when the electronic device 710 receives the ranging response message from the first target device 720 and a time when the electronic device 710 transmits the ranging final message to the first target device 720.

As described with reference to Equation 4, in order to determine a ToF value in DS-TWR, two measurement values at a transmitting end and two measurement values at a receiving end are required. This is because, for a device (e.g., the first target device 720) to determine a ToF value, the device requires two measurement values (e.g., the second round-trip time and the second reply time) measured by a counterpart (e.g., the electronic device 710). In the disclosure, to notify a measurement value measured by an electronic device to target devices, a measurement report message may be transmitted. A more detailed structure of the measurement report message will be described with reference to FIG. 7B.

FIG. 7B is a diagram illustrating a measurement report message.

Referring to FIG. 7B, a measurement report message may include a time difference between a transmission time of a ranging initiation message and a reception time of a ranging response message of each target device and a time difference between a reception time of a ranging response message of each target device and a transmission time of a ranging final message. For example, the measurement report message may include a first round-trip time ($T^1_{Round1}$) of a first responder, a first reply time ($T^1_{Reply2}$) of the first responder, a round-trip time ($T^2_{Round1}$) of a second responder, a reply time ($T^2_{Reply2}$) of the second responder, a second round-trip time ($T^N_{Round1}$) of an $N^{th}$ responder, and a second reply time ($T^N_{Reply2}$) of the $N^{th}$ responder. As described above, the $N^{th}$ responder may refer to an arbitrary responder other than the first responder.

When 1:N ranging is performed by using a DS-TWR method, for the first responder to the $N^{th}$ responder to calculate a distance to an initiator, all of the first responder to the $N^{th}$ responder require a measurement value of the initiator. Accordingly, as shown in FIG. 7B, 2*N measurement values obtained by multiplying two measurement values (round-trip time and reply time) measured for one target device by N that is the number of target devices must be included in the measurement report message and must be transmitted.

When a message is configured as described above, a size of the message may increase, and thus transmission (TX) power may decrease in relation to peak power regulation. When the size of the message increases, the message may not be transmitted at peak power. Also, when 2N pieces of information are included in the message, a size of the message is large, and thus a transmission time may increase. When the transmission time increases, the message is more likely to collide with other messages.

Accordingly, to efficiently perform ranging, a size of a message including a measurement value should be limited.

Embodiments of the disclosure may provide a method of transmitting a measurement report having a reduced size by using the principle that a sum of two measurement values for a first responder and a sum of two measurement values for an $N^{th}$ responder are equivalent.

According to an embodiment of the disclosure, a measurement report message may include a round-trip time measured by an electronic device for a certain responder (e.g., a first responder) and reply time information measured for all N responders. Each responder may detect a reply time measured for itself from the measurement report message, and may determine a round-trip time that is a measurement value not received from the electronic device.

According to another embodiment of the disclosure, a measurement report message may include a reply time measured by an electronic device for a certain responder (e.g., a first responder) and round-trip time information measured for all N responders. Each responder may detect a round-trip time measured for itself from the measurement report message, and may determine a reply time that is a measurement value not received from the electronic device.

Because the number of measurement values included in a measurement report message may be reduced as described above, a size of the measurement report message may be correspondingly reduced. A method of performing ranging according to an embodiment of the disclosure will be described with reference to FIGS. 8 through 15.

Figure 8:
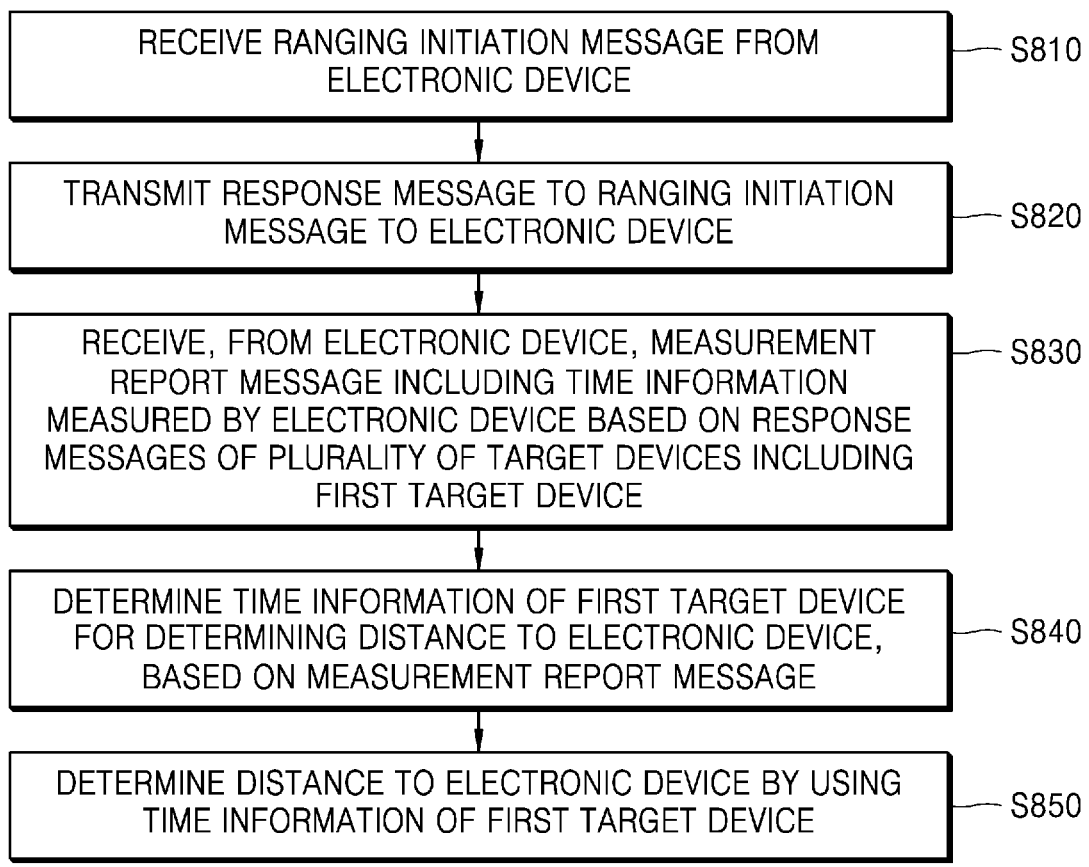
FIG. 8 is a flowchart of a method of operating a target device for transmitting and receiving data through an ultra-wideband (UWB) channel in a wireless communication system, according to an embodiment of the disclosure.

FIG. 8 is a flowchart of a method of operating a target device for transmitting and receiving data through an ultra-wideband (UWB) channel in a wireless communication system according to an embodiment of the disclosure.

A plurality of target devices that perform ranging with an electronic device may include a first target device and a second target device. In this case, the second target device that is a first responder may refer to a target device that transmits a first ranging response message.

In operation S810, a first target device may receive a ranging initiation message from an electronic device.

In operation S820, the first target device may transmit, to the electronic device, a response message in response to the ranging initiation message.

In operation S830, the first target device may receive, from the electronic device, a measurement report message including time information measured by the electronic device based on response messages of a plurality of target devices including the first target device.

The measurement report message according to an embodiment of the disclosure may be broadcast from the electronic device.

The measurement report message according to an embodiment of the disclosure may include an address of each of the plurality of target devices.

The measurement report message according to an embodiment of the disclosure may include a first round-trip time that is a time difference between a time when the electronic device transmits the ranging initiation message and a time when the electronic device receives a ranging response message from a second target device that transmits a first ranging response message and a reply time list including a time difference between a time when the electronic device receives a ranging response message from each of the plurality of target devices and a time when the electronic device transmits a ranging final message.

Referring to FIG. 6, the first round-trip time may refer to a value measured as a time difference between RMARKER included in a frame of the ranging initiation message transmitted by the electronic device to the second target device and RMAKER included in a frame of the ranging response message received from the second target device. Likewise, a second round-trip time may also be determined with reference to FIG. 6.

The reply time list according to an embodiment of the disclosure may include a first reply time that is a time difference between a time when the electronic device receives the ranging response message from the second target device and a time when the electronic device transmits the ranging final message and a second reply time that is a time difference between a time when the electronic device receives the ranging response message from the first target device and a time when the electronic device transmits the ranging final message.

Also, referring to FIG. 6, the first reply time may refer to a value measured as a time difference between RMARKER included in a frame of the ranging response message received by the electronic device from the second target device and RMARKER included in a frame of the ranging final message transmitted by the electronic device to the second target device. Likewise, the second reply time may also be determined with reference to FIG. 6.

An embodiment of using the measurement report message having the above structure will be described in more detail with reference to FIGS. 10A through 11B.

The measurement report message according to another embodiment of the disclosure may include a first reply time that is a time difference between a time when the electronic device receives the first ranging response message from the second target device and a time when the electronic device transmits the ranging final message and a round-trip time list including a time difference between a time when the electronic device transmits the ranging initiation message and a time when the electronic device receives the ranging response message from each of the plurality of target devices.

The round-trip time list according to an embodiment of the disclosure may include a first round-trip time that is a time difference between a time when the electronic device transmits the ranging initiation message and a time when the electronic device receives the ranging response message from the second target device and a second round-trip time that is a time difference between a time when the electronic device transmits the ranging initiation message and a time when the electronic device receives the ranging response message from the first target device.

An embodiment of using the measurement report message having the above structure will be described in more detail with reference to FIGS. 12A through 13B.

In operation S840, the first target device may determine time information of the first target device for determining a distance to the electronic device, based on the measurement report message.

The first target device according to an embodiment of the disclosure may determine a second round-trip time that is a time difference between a time when the electronic device transmits the ranging initiation message and a time when the electronic device receives the ranging response message from the first target device, based on the first round-trip time, the first reply time, and the second reply time included in the measurement report message.

The first target device according to another embodiment of the disclosure may determine a second reply time that is a time difference between a time when the electronic device transmits the ranging final message and a time when the electronic device receives the ranging response message from the first target device, based on the first reply time, the first round-trip time, and the second round-trip time included in the measurement report message.

In operation S850, the first target device may determine the distance to the electronic device by using the time information of the first target device.

For example, the first target device may calculate a ToF value by using Equation 4, and may determine the distance to the electronic device by multiplying the ToF value by a speed of light (3*10^8 m/s).

Figure 9:
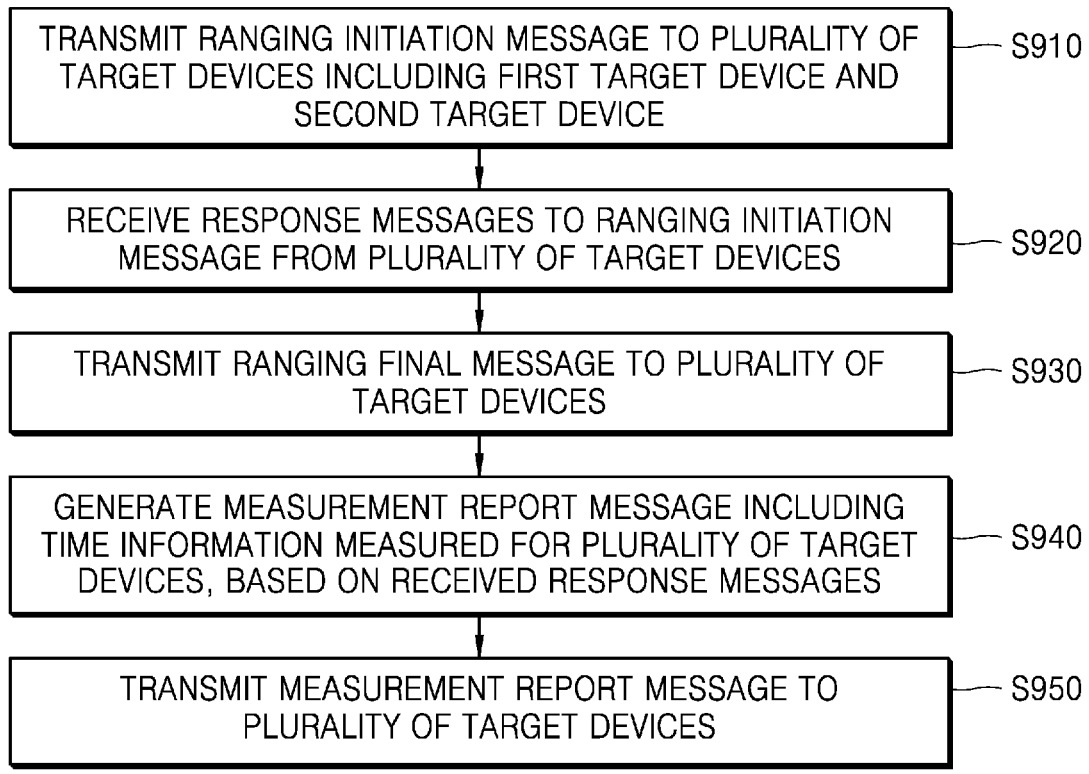
FIG. 9 is a flowchart of a method of operating an electronic device for transmitting and receiving data through a UWB channel in a wireless communication system, according to an embodiment of the disclosure.

FIG. 9 is a flowchart of a method of operating an electronic device for transmitting and receiving data through an ultra-wideband (UWB) channel in a wireless communication system according to an embodiment of the disclosure. In the description of FIG. 9, redundant descriptions of operations described with respect to FIG. 8 will be omitted.

In operation S910, an electronic device may transmit a ranging initiation message to a plurality of target devices including a first target device and a second target device. In operation S920, the electronic device may receive response messages in response to the ranging initiation message from the plurality of target devices. In operation S930, the electronic device may transmit a ranging final message to the plurality of target devices. In operation S940, the electronic device may generate a measurement report message including time information measured for the plurality of target devices, based on the received response messages.

In operation S950, the electronic device may transmit the measurement report message to the plurality of target devices.

The measurement report message according to an embodiment of the disclosure may be broadcast from the electronic device.

The measurement report message according to an embodiment of the disclosure may include a first round-trip time that is a time difference between a time when the electronic device transmits the ranging initiation message and a time when the electronic device receives a ranging response message from the second target device that transmits a first ranging response message and a reply time list including a time difference between a time when the electronic device receives a ranging response message from each of the plurality of target devices and a time when the electronic device transmits the ranging final message. An embodiment of using the measurement report message having the above structure will be described in more detail with reference to FIGS. 10A through 11B.

The measurement report message according to another embodiment of the disclosure may include a first reply time that is a time difference between a time when the electronic device receives the first ranging response message from the second target device and a time when the electronic device transmits the ranging final message and a round-trip time list including a time difference between a time when the electronic device transmits the ranging initiation message and a time when the electronic device receives the ranging response message from each of the plurality of target devices.

An embodiment of using the measurement report message having the above structure will be described in more detail with reference to FIGS. 12A through 13B.

Figure 10A:
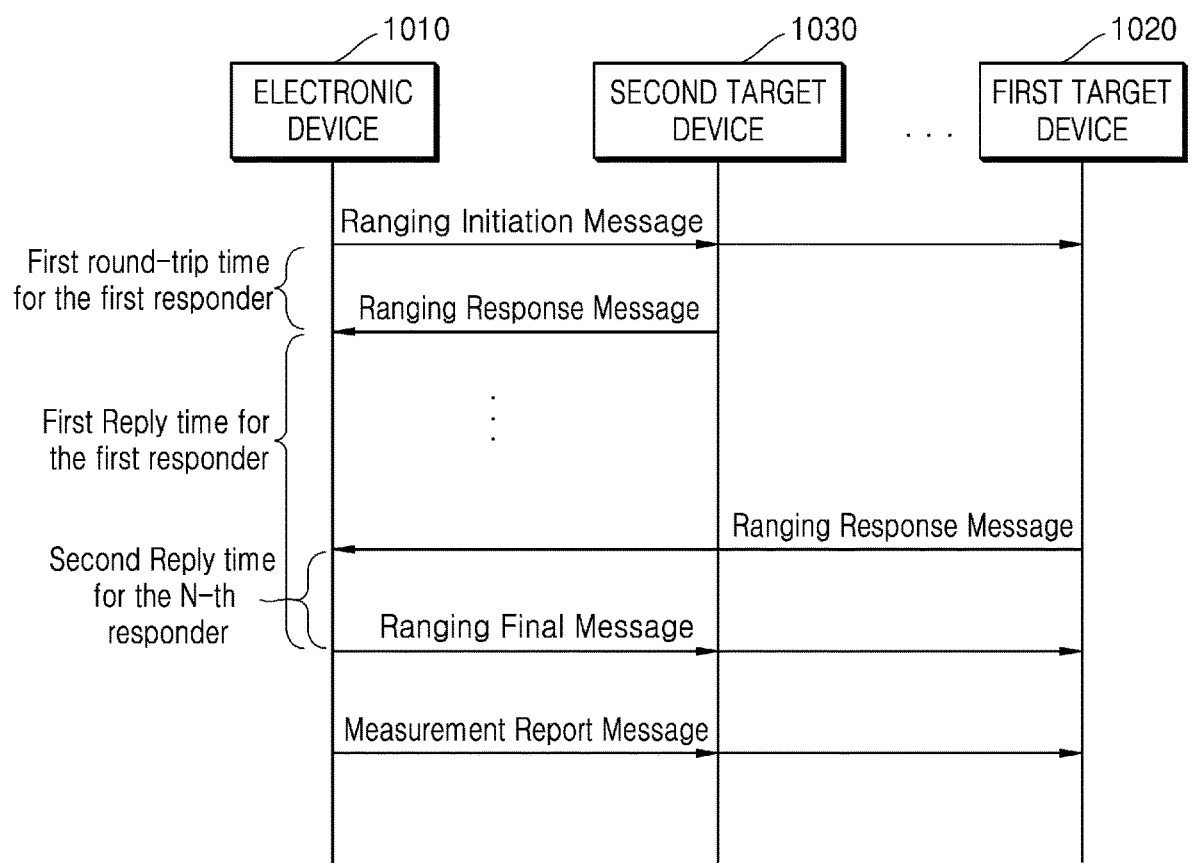
FIG. 10A is a diagram for describing an operation of transmitting and receiving data through a UWB channel, according to an embodiment of the disclosure.

FIG. 10A is a diagram for describing an operation of transmitting and receiving data through an ultra-wideband (UWB) channel according to an embodiment of the disclosure. FIG. 10B is a diagram illustrating a structure of a measurement report message according to an embodiment of the disclosure.

An electronic device 1010 may transmit a ranging initiation message to a first target device 1020 that is an $N^{th}$ responder and a second target device 1030 that is a first responder. Responders are not limited to the first target device 1020 and the second target device 1030, and the electronic device 1010 that is an initiator may transmit the ranging initiation message to any number of responders.

Each of the first target device 1020 and the second target device 1030 may transmit a ranging response message to the electronic device 1010. The electronic device 1010 may transmit a ranging final message to the first target device 1020 and the second target device 1030. The electronic device 1010 may transmit a measurement report message to the first target device 1020 and the second target device 1030.

Referring to FIG. 10B, the measurement report message according to an embodiment of the disclosure may include N+1 measurement values whose number is greater by 1 than N that is the total number of target devices. For example, the measurement report message may include a first round-trip time ($T^1_{Round1}$) and a first reply time ($T^1_{Reply2}$) that are measurement values for the second target device 1030 that is a first responder and a second reply time ($T^N_{Reply2}$) for the first target device 1020 that is an $N^{th}$ responder.

The first target device 1020 may detect the first round-trip time ($T^1_{Round1}$), the first reply time ($T^1_{Reply2}$), and the second reply time ($T^N_{Reply2}$) in the received measurement report message. The first target device 1020 may calculate a second round-trip time ($T^N_{Round1}$) for the first target device 1020 as shown in Equation 5, by using the detected measurement values.

$$T_{Round1}^{N} = T_{Round1}^{1} + T_{Reply2}^{1} - T_{Reply2}^{N} \qquad \text{[Equation 5]}$$

That is, as shown in Equation 5, the first target device 1020 may determine the second round-trip time ($T^N_{Round1}$) by subtracting the second reply time ($T^N_{Reply2}$) from a sum of the first round-trip time ($T^1_{Round1}$) and the first reply time ($T^1_{Reply2}$) for the second target device 1030.

The first target device 1020 may calculate a ToF value by using times measured by the first target device 1020, and second reply time ($T^N_{Reply2}$), and the determined second round-trip time ($T^N_{Round1}$).

When the measurement report message is configured by using the above method, a message may include only N+1 measurement values and may be transmitted.

FIG. 11A is a diagram for describing parameters included in a measurement report message according to an embodiment of the disclosure.

The measurement report message of FIG. 10B may include a parameter for a first round-trip time and a parameter for a reply time list.

The first round-trip time according to the disclosure may indicate a time difference between a ranging state message and a first ranging response message. For example, the parameter for the first round-trip time may have, but is not limited to, a size of 4 octets.

The reply time list according to the disclosure may indicate a list of responder addresses and reply time measurements for responders. For example, the reply time list may have, but is not limited to, a variable size that may vary according to the number of target devices functioning as responders. For example, when the number of target devices is N, the size of the responder address is 2 octets, and the size of the response time is 4 octets, the reply time list may have a size of 6*N octets.

FIG. 11B is a diagram for describing parameters included in a reply time list according to an embodiment of the disclosure.

The reply time list according to an embodiment of the disclosure may include an address parameter indicating an address of a responder and a reply time parameter indicating a time difference between a ranging final message and a ranging response message from the responder.

Table 1 is a table showing a structure of a vendor specific header IE format. For example, a measurement report message may be included in a vender specific header field in a message. For example, a vendor specific information field may include a UWB message ID and a UWB message. Also, a control message and a measurement report message may be included in the UWB message ID. However, the disclosure is not limited thereto.

TABLE 1

| | Bits: 7 | 7 | 1 | Octets: 3 | Variable |
|---|---|---|---|---|---|
| Field name | Length | Element ID | Type | Vendor OUI | Vendor Specific Information |
| Value | Size of Vendor Specific | 0 = Vendor specific | 0 = Header IE | TBD = FiRa OUI | Octet 1: UWB message ID Octets 2~: UWB |

TABLE 1-continued

| Bits: 7 | 7 | 1 | Octets: 3 | Variable |
|---|---|---|---|---|
| Information field | header IE | | | message |

Figure 12A:
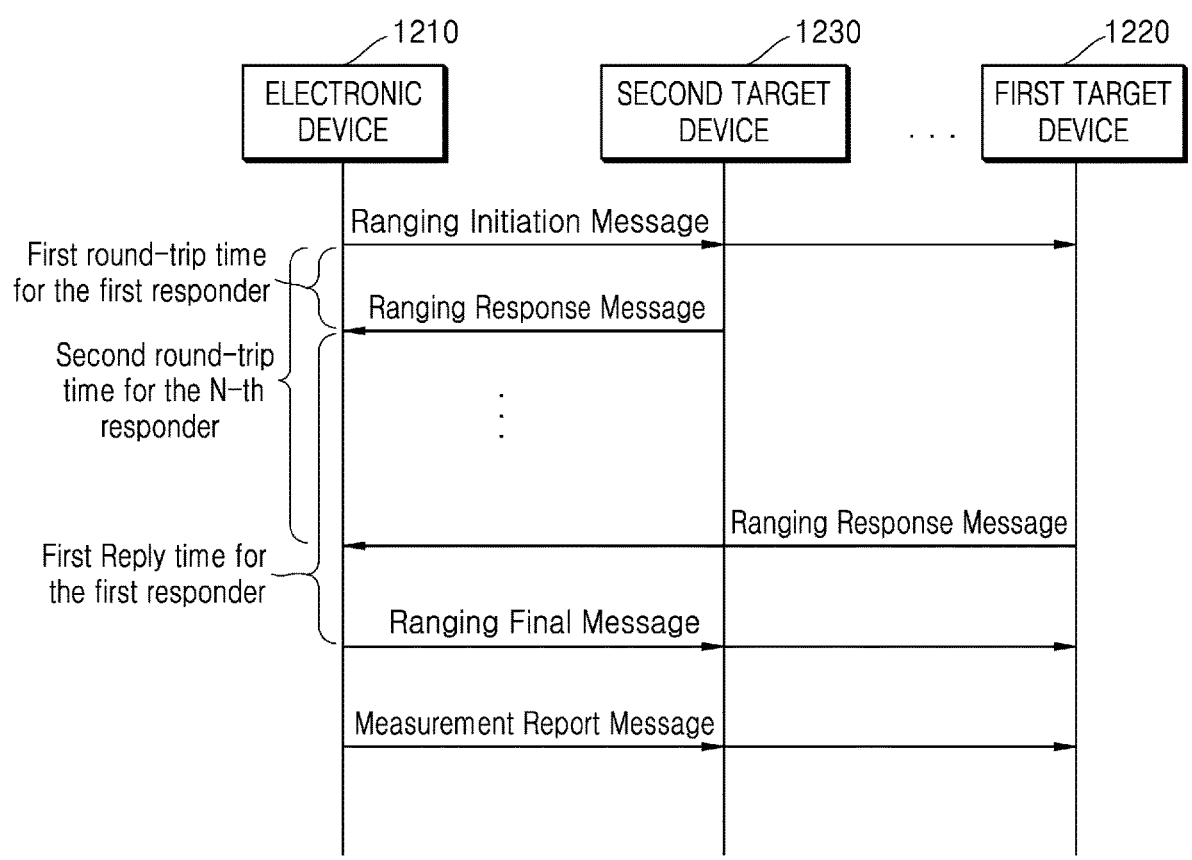
FIG. 12A is a diagram for describing an operation of transmitting and receiving data through a UWB channel, according to an embodiment of the disclosure.

FIG. 12A is a diagram for describing an operation of transmitting and receiving data through an ultra-wideband (UWB) channel according to an embodiment of the disclosure. FIG. 12B is a diagram illustrating a structure of a measurement report message according to an embodiment of the disclosure.

In the description of FIG. 12A, redundant descriptions of operations described with respect to FIG. 10A will be omitted.

An electronic device 1210 may transmit a ranging initiation message to a first target device 1220 that is an $N^{th}$ responder and a second target device 1230 that is a first responder. Each of the first target device 1220 and the second target device 1230 may transmit a ranging response message to the electronic device 1210. The electronic device 1210 may transmit a ranging final message to the first target device 1220 and the second target device 1230. The electronic device 1210 may transmit a measurement report message to the first target device 1220 and the second target device 1230.

Referring to FIG. 12B, the measurement report message according to an embodiment of the disclosure may include N+1 measurement values whose number is greater than N by 1, in which N is the total number of target devices. For example, the measurement report message may include a first round-trip time ($T^1_{Round1}$) and a first reply time ($T^1_{Reply2}$) that are measurement values for the second target device 1230 that is a first responder and a second round-trip time ($T^N_{Round1}$) for the first target device 1220 that is an $N^{th}$ responder.

The first target device 1220 may detect the first round-trip time ($T^1_{Round1}$), the first reply time ($T^1_{Reply2}$), and the second round-trip time ($T^N_{Round1}$) in the received measurement report message. The first target device 1220 may calculate a second reply time ($T^N_{Reply2}$) for the first target device 1220 as shown in Equation 6, by using the detected measurement values.

$$T^N_{Reply2} = T^1_{Round1} + T^1_{Reply2} - T^N_{Round1} \quad \text{[Equation 6]}$$

That is, as shown in Equation 6, the first target device 1220 may determine the second reply time ($T^N_{Reply2}$) by subtracting the second round-trip time ($T^N_{Round1}$) from a sum of the first round-trip time ($T^1_{Round1}$) and the first reply time ($T^1_{Reply2}$) for the second target device 1230.

The first target device 1220 may calculate a ToF value by using times measured by the first target device 1220, and second round-trip time ($T^N_{Round1}$), and the determined second reply time ($T^N_{Reply2}$).

When the measurement report message is configured by using the above method, a message may include only N+1 measurement values and may be transmitted.

FIG. 13A is a diagram for describing parameters included in a measurement report message according to an embodiment of the disclosure.

The measurement report message of FIG. 12B may include a parameter for a first reply time and a parameter for a round-trip time list.

The first reply time according to the disclosure may indicate a time difference between a ranging final message and a first ranging response message. For example, the parameter for the first reply time may have, but is not limited to, a size of 4 octets.

The round-trip time list according to the disclosure may indicate a list of responder addresses and reply time measurements for responders. For example, the round-trip time list may have, but is not limited to, a variable size that may vary according to the number of target devices functioning as responders. For example, when the number of target devices is N, the size of the responder address is 2 octets, and the size of the round-trip time is 4 octets, the round-trip time list may have a size of 6*N octets.

FIG. 13B is a diagram for describing parameters included in a round-trip time list according to an embodiment of the disclosure.

The round-trip time list according to an embodiment of the disclosure may include an address parameter indicating an address of a responder and a round-trip time parameter indicating a time difference between a ranging initiation message and a ranging response message from the responder.

Figure 14:
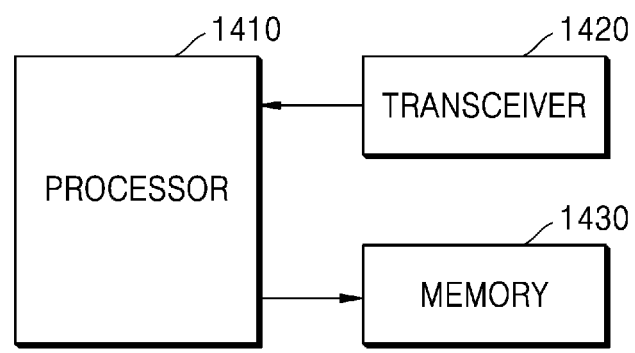
FIG. 14 is a block diagram of an electronic device according to an embodiment of the disclosure.

FIG. 14 is a block diagram of the electronic device 100 according to an embodiment of the disclosure.

The electronic device 100 according to an embodiment of the disclosure may correspond to the electronic device 1010 of FIG. 10A and the electronic device 1210 of FIG. 12A.

The electronic device 100 according to an embodiment of the disclosure may be a stationary terminal or a mobile terminal. Examples of the electronic device 100 may include, but are not limited to, at least one of a smartphone, a mobile phone, a navigation device, a computer, a laptop computer, a digital broadcasting terminal, an artificial intelligence speaker, a speaker, a personal digital assistant (PDA), a portable multimedia player (PMP), or a tablet PC. The electronic device 100 may communicate with other devices and/or servers via a network by using a wireless or wired communication method.

Referring to FIG. 14, the electronic device 100 according to an embodiment of the disclosure may include a processor 1410, a transceiver 1420, and a memory 1430. However, the electronic device 100 may include other configurations of elements than that illustrated in FIG. 14.

Although the electronic device 100 includes one processor in FIG. 14, an embodiment of the disclosure is not limited thereto and the electronic device 100 may include a plurality of processors. At least some of operations and functions of the processor 1410 may be performed under control by the plurality of processors. The electronic device 100 of FIG. 14 may control execution of the operating methods of the electronic device 100 according to various embodiments of the disclosure, and the description of FIGS. 8 through 13B may be applied.

The transceiver 1420 according to an embodiment of the disclosure may perform wired/wireless communication with another device, the target device 200, or a network. To this end, the transceiver 1420 may include a communication module that supports at least one of various wired/wireless communication methods. For example, the communication module may be a chipset, or may be a sticker/barcode (e.g., a sticker with a near-field communication (NFC) tag) storing information necessary for communication.

The wireless communication may include, for example, at least one of cellular communication, wireless fidelity (Wi-Fi), Wi-Fi Direct, Bluetooth, UWB, or near-field communication (NFC). The wired communication may include, for example, at least one of universal serial bus (USB) or high-definition multimedia interface (HDMI).

In an embodiment of the disclosure, the transceiver 1420 may include a communication module for short-range communication. For example, the transceiver 1420 may include a communication module for performing various short-range communications such as infrared communication and magnetic secure transmission (MST) communication, as well as UWB, Wi-Fi, Wi-Fi Direct, Bluetooth, and NFC described above.

The processor 1410 according to an embodiment of the disclosure controls overall operations of the electronic device 100 and may include at least one processor such as a central processing unit (CPU) or a graphics processing unit (GPU). The processor 1410 may control other components included in the electronic device 100 to perform UWB ranging. The memory 1430 may store a program for processing and controlling via execution performed by the processor 1410, and may store data input to or output from the electronic device 100.

The processor 1410 according to an embodiment of the disclosure may control the transceiver 1420 to transmit a ranging initiation message to a plurality of target devices including a first target device and a second target device. The processor 1410 may control the transceiver 1420 to receive a response message in response to the ranging initiation message from each of the plurality of target devices. The processor 1410 may control the transceiver 1420 to transmit a ranging final message to the plurality of target devices. Also, the processor 1410 may generate a measurement report message including time information measured for the plurality of target devices, based on the received response messages. The processor 1410 may control the transceiver 1420 to transmit the measurement report message to the plurality of target devices.

The processor 1410 according to an embodiment of the disclosure may control the transceiver 1420 to broadcast the measurement report message.

The description of FIGS. 8 through 13B may be applied to a specific method using which the processor 1410 performs ranging, and redundant descriptions are omitted.

Figure 15:
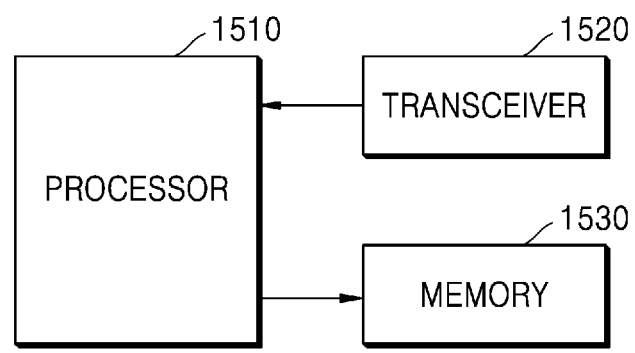
FIG. 15 is a block diagram of a target device according to an embodiment of the disclosure.

FIG. 15 is a block diagram of the target device 200 according to an embodiment of the disclosure.

The target device 200 according to an embodiment of the disclosure may correspond to the first target device 1020 of FIG. 10A and the first target device 1220 of FIG. 12A.

The target device 200 according to an embodiment of the disclosure may be a stationary terminal or a mobile terminal. Examples of the target device 200 may include, but are not limited to, at least one of a smartphone, a mobile phone, a navigation device, a computer, a laptop computer, a digital broadcasting terminal, an artificial intelligence speaker, a speaker, a personal digital assistant (PDA), a portable multimedia player (PMP), or a tablet PC. The target device 200 may communicate with other devices (e.g., the electronic device 100) and/or servers via a network by using a wireless or wired communication method.

Referring to FIG. 15, the target device 200 according to an embodiment of the disclosure may include a processor 1510, a transceiver 1520, and a memory 1530. However, the target device 200 may include other configurations of elements than that illustrated in FIG. 15.

Although the target device 200 includes one processor in FIG. 15, an embodiment of the disclosure is not limited thereto and the target device 200 may include a plurality of processors. At least some of operations and functions of the processor 1510 may be performed by the plurality of processors. The target device 200 of FIG. 15 may perform operating methods according to various embodiments of the disclosure, and the description of FIGS. 7A through 13B may be applied.

The transceiver 1520 according to an embodiment of the disclosure may perform wired/wireless communication with another device (e.g., the electronic device 100) or a network. To this end, the transceiver 1520 may include a communication module that supports at least one of various wired and wireless communication methods. For example, the communication module may be a chipset, or may be a sticker/barcode (e.g., a sticker with an NFC tag) storing information necessary for communication.

The wireless communication may include, for example, at least one of cellular communication, wireless fidelity (Wi-Fi), Wi-Fi Direct, Bluetooth, UWB, or near-field communication (NFC). The wired communication may include, for example, at least one of USB or high-definition multimedia interface (HDMI).

In an embodiment of the disclosure, the transceiver 1520 may include a communication module for short-range communication. For example, the transceiver 1520 may include a communication module for performing various short-range communications such as infrared communication and magnetic secure transmission (MST) communication, as well as UWB, Wi-Fi, Wi-Fi Direct, Bluetooth, and NFC described above.

The processor 1510 according to an embodiment of the disclosure controls overall operations of the target device 200 and may include at least one processor such as a CPU or a GPU. The processor 1510 may control other components included in the target device 200 to perform UWB ranging. The memory 1530 may store a program for processing and controlling execution performed by the processor 1510, and may store data input to or output from the target device 200.

The processor 1510 according to an embodiment of the disclosure may control the transceiver 1520 to receive a ranging initiation message from the electronic device 100. The processor 1510 may control the transceiver 1520 to transmit a response message in response to the ranging initiation message to the electronic device 100.

The processor 1510 may control the transceiver 1520 to receive, from the electronic device 100, a measurement report message including time information measured by the electronic device 100 based on response messages of a plurality of target devices including a first target device.

The processor 1510 may determine time information of the first target device for determining a distance to the electronic device 100, based on the measurement report message. Also, the processor 1510 may determine the distance to the electronic device 100 by using the time information of the first target device.

The measurement report message according to an embodiment of the disclosure may include a first round-trip time that is a time difference between a time when the ranging initiation message is transmitted and a time when a ranging response message is received from a second target device that transmits a first ranging response message and a reply time list including a time difference between a time when the electronic device 100 transmits a ranging final message and a time when the electronic device 100 receives a ranging response message from each of the plurality of target devices.

The reply time list according to an embodiment of the disclosure may include a first reply time that is a time difference between a time when the ranging response message is received from the second target device and a time when the ranging final message is transmitted and a second reply time that is a time difference between a time when a ranging response message is received from the first target device and a time when the ranging final message is transmitted.

The processor 1510 according to an embodiment of the disclosure may determine a second round-trip time that is a time difference between a time when the electronic device 100 transmits the ranging initiation message and a time when the electronic device 100 receives the ranging response message from the first target device, based on the first round-trip time, the first reply time, and the second reply time included in the measurement report.

The measurement report message according to an embodiment of the disclosure may include a first reply time that is a time difference between a time when the first ranging response message is received from the second target device and a time when the electronic device 100 transmits the ranging final message and a round-trip time list including a time difference between a time when the ranging initiation message is transmitted and a time when the ranging response message is received from each of the plurality of target devices.

The round-trip time list according to an embodiment of the disclosure may include a first round-trip time that is a time difference between a time when the ranging initiation message is transmitted and a time when the ranging response message is received from the second target device and a second round-trip time that is a time difference between a time when the ranging initiation message is transmitted and a time when the ranging response message is received from the first target device.

The processor 1510 according to an embodiment of the disclosure may determine a second reply time that is a time difference between a time when the ranging final message is transmitted and a time when the ranging response message is received from the first target device, based on the first reply time, the first round-trip time, and the second round-trip time included in the measurement report.

The description of FIGS. 8 through 13 may be applied to a specific method using which the processor 1510 performs ranging.

The afore-described embodiments of the disclosure may be implemented as a computer-executable program, and may be executed by a general-purpose digital computer or processor that executes the program accessed from a computer-readable recording medium. Also, a structure of data used in the embodiments of the disclosure may be recorded by using various units on a computer-readable medium. Also, the embodiments of the disclosure may be implemented as a computer program product including a recording medium including instructions that may be executed in computers, e.g., a program module executed in computers. For example, methods may be implemented as software modules or algorithms, and may be stored as program commands or computer-readable code executable on a computer-readable medium.

The computer-readable medium may be an arbitrary available medium accessible by a computer, and examples thereof may include all volatile and non-volatile media and separable and non-separable media. Examples of the computer-readable medium may include, but are not limited to, magnetic storage media (e.g., read-only memories (ROMs), floppy disks, and hard disks) and optical recording media (e.g., compact disk (CD)-ROMs and digital versatile disks (DVDs)). Further, examples of the computer-readable medium may include a computer storage medium and a communication medium.

Also, the computer-readable recording media may be distributed over network-coupled computer systems, and data stored in the distributed recording media, for example, program instructions and code, may be executed by at least one computer.

A machine-readable storage medium may be provided as a non-transitory storage medium. Here, 'non-transitory' means that the storage medium does not include a signal and is tangible, but does not distinguish whether data is stored semi-permanently or temporarily in the storage medium. For example, the 'non-transitory storage medium' may include a buffer in which data is temporarily stored.

Methods according to various embodiments of the disclosure may be provided by being included in a computer program product. The computer program product may be traded as a product between a seller and a purchaser.

The computer program product may be distributed in the form of a machine-readable storage medium (e.g., a compact disc read only memory (CD-ROM)), or may be distributed (e.g., downloaded or uploaded) online via an application store (e.g., Play Store™) or between two user devices (e.g., smartphones) directly. When distributed online, at least part of the computer program product (e.g., a downloadable application) may be temporarily generated or at least temporarily stored in a machine-readable storage medium, such as a memory of a manufacturer's server, a server of an application store, or a relay server.

A method of efficiently transmitting a message for determining a distance between electronic devices during ranging is required.

While the disclosure has been particularly shown and described with reference to embodiments thereof, it will be understood by one of ordinary skill in the art that various changes in form and details may be made therein without departing from the spirit and scope of the disclosure as defined by the appended claims. The embodiments of the disclosure should be considered in descriptive sense only and not for purposes of limitation.

What is claimed is:

1. A method performed by a target device for transmitting and receiving data through an ultra-wideband (UWB) channel in a wireless communication system, the method comprising:
   receiving, from an electronic device, a ranging initiation message;
   transmitting, to the electronic device, a ranging response message in response to receiving the ranging initiation message;
   receiving, from the electronic device, a measurement report message including first round-trip time information for another target device corresponding to a first responder and a reply time list for a plurality of target devices; and
   identifying round-trip time information of the target device, based on the measurement report message including the first round-trip time information and the reply time list.

2. The method of claim 1,
   wherein the first round-trip time information indicates a time difference between the ranging initiation message from the electronic device and another ranging response message from the another target device.

3. The method of claim 1, wherein the reply time list includes first reply time information for the another target device and second reply time information for the target device,
   wherein the first reply time information indicating a time difference between another ranging response message from the another target device and a ranging final message from the electronic device, and
   wherein the reply time information indicating a time difference between the ranging response message from the target device and the ranging final message from the electronic device.

4. The method of claim 1,
   wherein the round-trip time information of the target device corresponds to a time difference between the ranging initiation message from the electronic device and the ranging response message from the target device, and
   wherein the round-trip time information of the target device is identified based on the first round-trip time information, first reply time information for the another target device, and second reply time information for the target device.

5. The method of claim 1,
   wherein the round-trip time information of the target device is a value by subtracting second reply time information for the target device from a sum of the first round-trip time information for the another target device and first reply time information for the another target device.

6. The method of claim 1, wherein the reply time list comprising address information corresponding to respective the plurality of target devices and reply time information corresponding to the address information.

7. The method of claim 1, wherein the measurement report message is broadcast from the electronic device.

8. A method performed by an electronic device for transmitting and receiving data through an ultra-wideband (UWB) channel in a wireless communication system, the method comprising:
   transmitting a plurality of ranging initiation messages to a plurality of target devices comprising a target device and another target device corresponding to a first responder;
   receiving, from the plurality of target devices, a plurality of ranging response messages in response to the ranging initiation messages; and
   transmitting to the plurality of target devices, a plurality of measurement report messages including first round-trip time information for the another target device and a reply time list for the plurality of target devices,
   wherein round-trip time information of the target device is, based on a measurement report message including the first round-trip time information and the reply time list.

9. The method of claim 8,
   wherein the first round-trip time information indicates a time difference between the plurality of ranging initiation messages and a ranging response message from the another target device.

10. The method of claim 8, wherein the reply time list includes first reply time information for the another target device and second reply time information for the target device,
    wherein the first reply time information indicating a time difference between a ranging response message from the another target device and a ranging final message from the electronic device, and
    wherein the second reply information indicating a time difference between a ranging response message from the target device and the ranging final message from the electronic device.

11. The method of claim 8,
    wherein the round-trip time information of the target device is identified based on the first round-trip time information, first reply time information for the another target device, and second reply time information for the target device, and
    wherein the round-trip time information of the target device corresponds to a time difference between a ranging initiation message from electronic device a ranging response message from the target device.

12. The method of claim 8,
    wherein the round-trip time information of the target device is a value by subtracting second reply time information for the target device from a sum of the first round-trip time information for the another target device and first reply time information for the another target device.

13. The method of claim 8, wherein the measurement report message is broadcast from the electronic device.

14. The method of claim 8, wherein the reply time list comprises address information corresponding to respective the plurality of target devices and reply time information corresponding to the address information.

15. A target device in a wireless communication system, the target device comprising:
    a transceiver; and
    a processor connected to the transceiver and configured to:
    control the transceiver to receive, from an electronic device, a ranging initiation message,
    control the transceiver to transmit, to the electronic device, a ranging response message in response to receiving the ranging initiation message,
    control the transceiver to receive, from the electronic device, a measurement report message including first round-trip time information for another target device corresponding to a first responder and a reply time list for a plurality of target devices, and
    identify round-trip time information of the target device, based on the measurement report message including the first round-trip time information and the reply time list.

16. The target device of claim 15,
    wherein the first round-trip time information indicates a time difference between the ranging initiation message from an electronic device and another ranging response message from the another target device.

17. The first target device of claim 15, wherein the reply time list includes first reply time information for the another target device and second reply time information for the target device,
    wherein the first reply time information indicating a time difference between another ranging response message from the another target device and a ranging final message from the electronic device, and
    wherein the reply time information indicating a time difference between the ranging response message from the target device and the ranging final message from the electronic device.

18. The target device of claim 15,
    wherein the round-trip time information of the target device corresponds to a time difference between the ranging initiation message from electronic device and the ranging response message from the target device, and wherein the round-trip time information of the target device is identified based on the first round-trip time information, first reply time information for the another target device, and second reply time information for the target device.

19. The first target device of claim 15, wherein the round-trip time information of the target device is a value by subtracting second reply time information for the target device from a sum of the first round-trip time information for the another target device and first reply time information for the another target device.

* * * * *